(12) United States Patent
Uhlig et al.

(10) Patent No.: US 12,065,156 B2
(45) Date of Patent: Aug. 20, 2024

(54) FAILOVER SYSTEM FOR AUTONOMOUS VEHICLES

(71) Applicant: GHOST AUTONOMY INC., Mountain View, CA (US)

(72) Inventors: Volkmar Uhlig, Cupertino, CA (US); John Hayes, Mountain View, CA (US); Aaron Carroll, Mountain View, CA (US)

(73) Assignee: GHOST AUTONOMY INC., Mountain View, CA (US)

( * ) Notice: Subject to any disclaimer, the term of this patent is extended or adjusted under 35 U.S.C. 154(b) by 325 days.

(21) Appl. No.: 17/706,749

(22) Filed: Mar. 29, 2022

(65) Prior Publication Data

US 2022/0371607 A1    Nov. 24, 2022

Related U.S. Application Data

(60) Provisional application No. 63/192,369, filed on May 24, 2021.

(51) Int. Cl.
*B60W 50/02* (2012.01)
*B60W 50/029* (2012.01)
*B60W 50/14* (2020.01)
*B60W 60/00* (2020.01)

(52) U.S. Cl.
CPC ...... *B60W 50/029* (2013.01); *B60W 50/0205* (2013.01); *B60W 50/14* (2013.01); *B60W 60/0053* (2020.02); *B60W 2050/0292* (2013.01)

(58) Field of Classification Search
CPC .......... B60W 50/029; B60W 50/0205; B60W 50/14; B60W 60/0053; B60W 2050/0292; B60W 2050/0006; B60W 60/00186
See application file for complete search history.

(56) References Cited

U.S. PATENT DOCUMENTS

| | | | |
|---|---|---|---|
| 2018/0136653 A1* | 5/2018 | Tao | B60W 60/0016 |
| 2021/0179122 A1* | 6/2021 | Zhu | G05D 1/0214 |
| 2021/0387631 A1* | 12/2021 | Gong | B60W 10/18 |
| 2022/0089168 A1* | 3/2022 | Hoos | B60L 3/0092 |
| 2022/0185115 A1* | 6/2022 | Divekar | B60W 30/181 |

* cited by examiner

*Primary Examiner* — Kira Nguyen

(57) ABSTRACT

A failover system for autonomous vehicles, including: detecting an error associated with a hardware resource of a first autonomous driving system of the autonomous vehicle; performing a failover from the first autonomous driving system to a second autonomous driving system comprising fewer hardware resources relative to the first autonomous driving system, wherein performing the failover causes control operations generated by the second autonomous driving system to be applied to the autonomous vehicle instead of control operations generated by the first autonomous driving system; and reconfigure one or more other hardware resources of the first autonomous driving system not associated with the error into a redundant autonomous driving system.

20 Claims, 10 Drawing Sheets

FAILOVER SYSTEM FOR AUTONOMOUS VEHICLES

CROSS-REFERENCE TO RELATED APPLICATION

This is a non-provisional application for patent entitled to a filing date and claiming the benefit of earlier-filed U.S. Provisional Patent Application No. 63/192,369, filed May 24, 2021, herein incorporated by reference in its entirety.

BACKGROUND

Field of the Invention

The field of the invention is failover systems, or, more specifically, methods, apparatus, autonomous vehicles, and products for a failover system for autonomous vehicles.

Description of Related Art

Autonomous vehicles may use autonomous driving systems to generate control operations for the autonomous vehicle when in an autonomous driving mode. In the event of a failure of a hardware component of the autonomous vehicle, the autonomous vehicle will either need to deactivate an autonomous driving mode or fail over to a fully redundant autonomous driving system.

SUMMARY

A failover system for autonomous vehicles may include: detecting an error associated with a hardware resource of a first autonomous driving system of the autonomous vehicle; performing a failover from the first autonomous driving system to a second autonomous driving system comprising fewer hardware resources relative to the first autonomous driving system, wherein performing the failover causes control operations generated by the second autonomous driving system to be applied to the autonomous vehicle instead of control operations generated by the first autonomous driving system; and reconfigure one or more other hardware resources of the first autonomous driving system not associated with the error into a redundant autonomous driving system.

The foregoing and other objects, features and advantages of the invention will be apparent from the following more particular descriptions of exemplary embodiments of the invention as illustrated in the accompanying drawings wherein like reference numbers generally represent like parts of exemplary embodiments of the invention.

DETAILED DESCRIPTION

Figure 1:
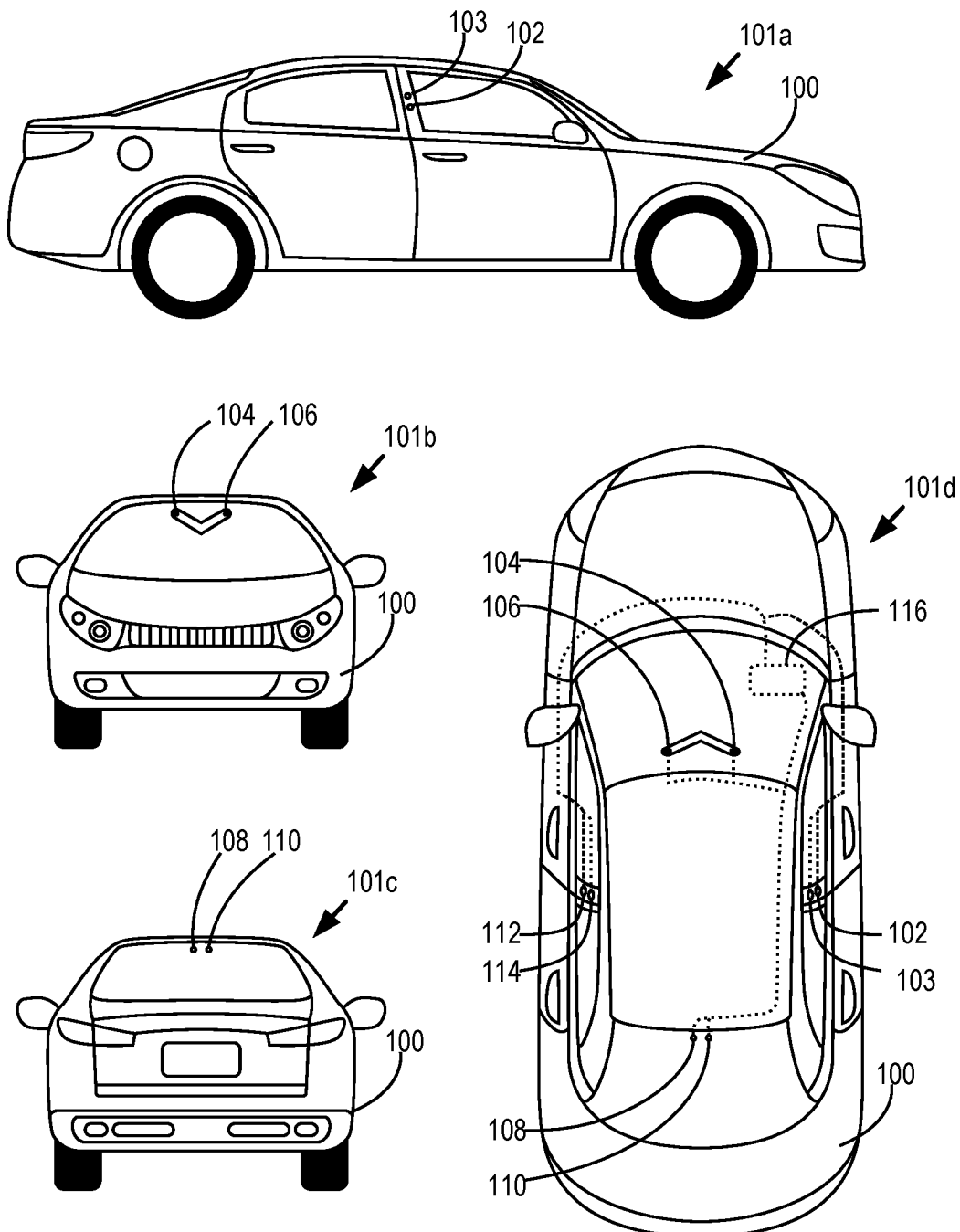
FIG. 1 shows example views of an autonomous vehicle for a failover system for autonomous vehicles.

A failover system for autonomous vehicles may be implemented in an autonomous vehicle. Accordingly, FIG. 1 shows multiple views of an autonomous vehicle 100 configured for a failover system for autonomous vehicles according to embodiments of the present invention. Right side view 101a shows a right side of the autonomous vehicle 100. Shown in the right side view 101a are cameras 102 and 103, configured to capture image data, video data, and/or audio data of the environmental state of the autonomous vehicle 100 from the perspective of the right side of the car. Front view 101b shows a front side of the autonomous vehicle 100. Shown in the front view 101b are cameras 104 and 106, configured to capture image data, video data, and/or audio data of the environmental state of the autonomous vehicle 100 from the perspective of the front of the car. Rear view 101c shows a rear side of the autonomous vehicle 100. Shown in the rear view 101c are cameras 108 and 110, configured to capture image data, video data, and/or audio data of the environmental state of the autonomous vehicle 100 from the perspective of the rear of the car. Top view 101d shows a rear side of the autonomous vehicle 100. Shown in the top view 101d are cameras 102-110. Also shown are cameras 112 and 114, configured to capture image data, video data, and/or audio data of the environmental state of the autonomous vehicle 100 from the perspective of the left side of the car.

Further shown in the top view 101d is an automation computing system 116. The automation computing system 116 comprises one or more computing devices configured to control one or more autonomous operations (e.g., autonomous driving operations) of the autonomous vehicle 100. For example, the automation computing system 116 may be configured to process sensor data (e.g., data from the cameras 102-114 and potentially other sensors), operational data (e.g., a speed, acceleration, gear, orientation, turning direction), and other data to determine a operational state and/or operational history of the autonomous vehicle. The automation computing system 116 may then determine one or more operational commands for the autonomous vehicle (e.g., a change in speed or acceleration, a change in brake application, a change in gear, a change in turning or orientation, etc.). The automation computing system 116 may also capture and store sensor data. Operational data of the autonomous vehicle may also be stored in association with corresponding sensor data, thereby indicating the operational data of the autonomous vehicle 100 at the time the sensor data was captured.

Although the autonomous vehicle 100 if FIG. 1 is shown as car, it is understood that autonomous vehicles 100 configured for a failover system for autonomous vehicles may also include other vehicles, including motorcycles, planes, helicopters, unmanned aerial vehicles (UAVs, e.g., drones), or other vehicles as can be appreciated. Moreover, it is understood that additional cameras or other external sensors may also be included in the autonomous vehicle 100.

A failover system for autonomous vehicles in accordance with the present invention is generally implemented with computers, that is, with automated computing machinery. For further explanation, therefore, FIG. 2 sets forth a block diagram of automated computing machinery comprising an exemplary automation computing system 116 configured for a failover system for autonomous vehicles according to embodiments of the present invention. The automation computing system 116 of FIG. 2 includes at least one computer Central Processing Unit (CPU) package 204 as well as random access memory 206 ('RAM') which is connected through a high speed memory bus 208 and bus adapter 210 to CPU packages 204 via a front side bus 211 and to other components of the automation computing system 116.

A CPU package 204 may comprise a plurality of processing units. For example, each CPU package 204 may comprise a logical or physical grouping of a plurality of processing units. Each processing unit may be allocated a particular process for execution. Moreover, each CPU package 204 may comprise one or more redundant processing units. A redundant processing unit is a processing unit not allocated a particular process for execution unless a failure occurs in another processing unit. For example, when a given processing unit allocated a particular process fails, a redundant processing unit may be selected and allocated the given process. A process may be allocated to a plurality of processing units within the same CPU package 204 or different CPU packages 204. For example, a given process may be allocated to a primary processing unit in a CPU package 204. The results or output of the given process may be output from the primary processing unit to a receiving process or service. The given process may also be executed in parallel on a secondary processing unit. The secondary processing unit may be included within the same CPU package 204 or a different CPU package 204. The secondary processing unit may not provide its output or results of the process until the primary processing unit fails. The receiving process or service will then receive data from the secondary processing unit. A redundant processing unit may then be selected and have allocated the given process to ensure that two or more processing units are allocated the given process for redundancy and increased reliability.

The CPU packages 204 are communicatively coupled to one or more sensors 212. The sensors 212 are configured to capture sensor data describing the operational and environmental conditions of an autonomous vehicle. For example, the sensors 212 may include cameras (e.g., the cameras 102-114 of FIG. 1), accelerometers, Global Positioning System (GPS) radios, Lidar sensors, or other sensors as can be appreciated. As described herein, cameras may include a stolid state sensor 212 with a solid state shutter capable of measuring photons or a time of flight of photons. For example, a camera may be configured to capture or measure photons captured via the shutter for encoding as images and/or video data. As another example, a camera may emit photons and measure the time of flight of the emitted photons. Cameras may also include event cameras configured to measure changes in light and/or motion of light.

Although the sensors 212 are shown as being external to the automation computing system 116, it is understood that one or more of the sensors 212 may reside as a component of the automation computing system 116 (e.g., on the same board, within the same housing or chassis). The sensors 212 may be communicatively coupled with the CPU packages 204 via a switched fabric 213. The switched fabric 213 comprises a communications topology through which the CPU packages 204 and sensors 212 are coupled via a plurality of switching mechanisms (e.g., latches, switches, crossbar switches, field programmable gate arrays (FPGAs), etc.). For example, the switched fabric 213 may implement a mesh connection connecting the CPU packages 204 and sensors 212 as endpoints, with the switching mechanisms serving as intermediary nodes of the mesh connection. The CPU packages 204 and sensors 212 may be in communication via a plurality of switched fabrics 213. For example, each of the switched fabrics 213 may include the CPU packages 204 and sensors 212, or a subset of the CPU packages 204 and sensors 212, as endpoints. Each switched fabric 213 may also comprise a respective plurality of switching components. The switching components of a given switched fabric 213 may be independent (e.g., not connected) of the switching components of other switched fabrics 213 such that only switched fabric 213 endpoints (e.g., the CPU packages 204 and sensors 212) are overlapping across the switched fabrics 213. This provides redundancy such that, should a connection between a CPU package 204 and sensor 212 fail in one switched fabric 213, the CPU package 204 and sensor 212 may remain connected via another switched fabric 213. Moreover, in the event of a failure in a CPU package 204, a processor of a CPU package 204, or a sensor, a communications path excluding the failed component and including a functional redundant component may be established.

The CPU packages 204 and sensors 212 are configured to receive power from one or more power supplies 215. The power supplies 215 may comprise an extension of a power system of the autonomous vehicle 100 or an independent power source (e.g., a battery). The power supplies 215 may supply power to the CPU packages 204 and sensors 212 by another switched fabric 214. The switched fabric 214 provides redundant power pathways such that, in the event of a failure in a power connection, a new power connection pathway may be established to the CPU packages 204 and sensors 212.

Stored in RAM 206 is an automation module 220. The automation module 220 may be configured to process sensor data from the sensors 212 to determine a driving decision for the autonomous vehicle. The driving decision comprises one or more operational commands for an autonomous vehicle 100 to affect the movement, direction, or other function of the autonomous vehicle 100, thereby facilitating autonomous driving or operation of the vehicle. Such operational commands may include a change in the speed of the autonomous vehicle 100, a change in steering direction, a change in gear, or other command as can be appreciated. For example, the automation module 220 may provide sensor data and/or processed sensor data as one or more inputs to a trained machine learning model (e.g., a trained neural network) to determine the one or more operational commands. The operational commands may then be communicated to autonomous vehicle control systems 223 via a vehicle interface 222.

In some embodiments, the automation module 220 may be configured to determine an exit path for an autonomous vehicle 100 in motion. The exit path includes one or more operational commands that, if executed, are determined and/or predicted to bring the autonomous vehicle 100 safely to a stop (e.g., without collision with an object, without violating one or more safety rules). The automation module 220 may determine a both a driving decision and an exit path at a predefined interval. The automation module 220 may then send the driving decision and the exit path to the autonomous vehicle control systems 223. The autonomous vehicle control systems 223 may be configured to execute the driving decision unless an error state has been reached. If an error decision has been reached, therefore indicating a possible error in functionality of the automation computing system 116), the autonomous vehicle control systems 223 may then execute a last received exit path in order to bring the autonomous vehicle 100 safely to a stop. Thus, the autonomous vehicle control systems 223 are configured to receive both a driving decision and exit path at predefined intervals, and execute the exit path in response to an error.

The autonomous vehicle control systems 223 are configured to affect the movement and operation of the autonomous vehicle 100. For example, the autonomous vehicle control systems 223 may activate (e.g., apply one or more control signals) to actuators or other components to turn or otherwise change the direction of the autonomous vehicle 100, accelerate or decelerate the autonomous vehicle 100, change a gear of the autonomous vehicle 100, or otherwise affect the movement and operation of the autonomous vehicle 100.

Further stored in RAM 206 is a data collection module 224 configured to process and/or store sensor data received from the one or more sensors 212. For example, the data collection module 224 may store the sensor data as captured by the one or more sensors 212, or processed sensor 212 data (e.g., sensor 212 data having object recognition, compression, depth filtering, or other processes applied). Such processing may be performed by the data collection module 224 in real-time or in substantially real-time as the sensor data is captured by the one or more sensors 212. The processed sensor data may then be used by other functions or modules. For example, the automation module 220 may use processed sensor data as input to determine one or more operational commands. The data collection module 224 may store the sensor data in data storage 218.

Also stored in RAM 206 is a data processing module 226. The data processing module 226 is configured to perform one or more processes on stored sensor data (e.g., stored in data storage 218 by the data collection module 218) prior to upload to a execution environment 227. Such operations can include filtering, compression, encoding, decoding, or other operations as can be appreciated. The data processing module 226 may then communicate the processed and stored sensor data to the execution environment 227.

Further stored in RAM 206 is a hypervisor 228. The hypervisor 228 is configured to manage the configuration and execution of one or more virtual machines 229. For example, each virtual machine 229 may emulate and/or simulate the operation of a computer. Accordingly, each virtual machine 229 may comprise a guest operating system 216 for the simulated computer. The hypervisor 228 may manage the creation of a virtual machine 229 including installation of the guest operating system 216. The hypervisor 228 may also manage when execution of a virtual machine 229 begins, is suspended, is resumed, or is terminated. The hypervisor 228 may also control access to computational resources (e.g., processing resources, memory resources, device resources) by each of the virtual machines.

Each of the virtual machines 229 may be configured to execute one or more of the automation module 220, the data collection module 224, the data processing module 226, or combinations thereof. Moreover, as is set forth above, each of the virtual machines 229 may comprise its own guest operating system 216. Guest operating systems 216 useful in autonomous vehicles in accordance with some embodiments of the present disclosure include UNIX™, Linux™, Microsoft Windows™, AIX™, IBM's iOS™, and others as will occur to those of skill in the art. For example, the autonomous vehicle 100 may be configured to execute a first operating system when the autonomous vehicle is in an autonomous (or even partially autonomous) driving mode and the autonomous vehicle 100 may be configured to execute a second operating system when the autonomous vehicle is not in an autonomous (or even partially autonomous) driving mode. In such an example, the first operating system may be formally verified, secure, and operate in real-time such that data collected from the sensors 212 are processed within a predetermined period of time, and autonomous driving operations are performed within a predetermined period of time, such that data is processed and acted upon essentially in real-time. Continuing with this example, the second operating system may not be formally verified, may be less secure, and may not operate in real-time as the tasks that are carried out (which are described in greater detail below) by the second operating system are not as time-sensitive the tasks (e.g., carrying out self-driving operations) performed by the first operating system.

Readers will appreciate that although the example included in the preceding paragraph relates to an embodiment where the autonomous vehicle 100 may be configured to execute a first operating system when the autonomous vehicle is in an autonomous (or even partially autonomous) driving mode and the autonomous vehicle 100 may be configured to execute a second operating system when the autonomous vehicle is not in an autonomous (or even partially autonomous) driving mode, other embodiments are within the scope of the present disclosure. For example, in another embodiment one CPU (or other appropriate entity such as a chip, CPU core, and so on) may be executing the first operating system and a second CPU (or other appropriate entity) may be executing the second operating system, where switching between these two modalities is accomplished through fabric switching, as described in greater detail below. Likewise, in some embodiments, processing resources such as a CPU may be partitioned where a first partition supports the execution of the first operating system and a second partition supports the execution of the second operating system.

The guest operating systems 216 may correspond to a particular operating system modality. An operating system modality is a set of parameters or constraints which a given operating system satisfies, and are not satisfied by operating systems of another modality. For example, a given operating system may be considered a "real-time operating system" in that one or more processes executed by the operating system must be performed according to one or more time constraints. For example, as the automation module 220 must make determinations as to operational commands to facilitate autonomous operation of a vehicle. Accordingly, the automation module 220 must make such determinations within one or more time constraints in order for autonomous operation to be performed in real time. The automation module 220 may then be executed in an operating system (e.g., a guest operating system 216 of a virtual machine 229) corresponding to a "real-time operating system" modality. Conversely, the data processing module 226 may be able to perform its processing of sensor data independent of any time constrains, and may then be executed in an operating system (e.g., a guest operating system 216 of a virtual machine 229) corresponding to a "non-real-time operating system" modality.

As another example, an operating system (e.g., a guest operating system 216 of a virtual machine 229) may comprise a formally verified operating system. A formally verified operating system is an operating system for which the correctness of each function and operation has been verified with respect to a formal specification according to formal proofs. A formally verified operating system and an unverified operating system (e.g., one that has not been formally verified according to these proofs) can be said to operate in different modalities.

Figure 2:
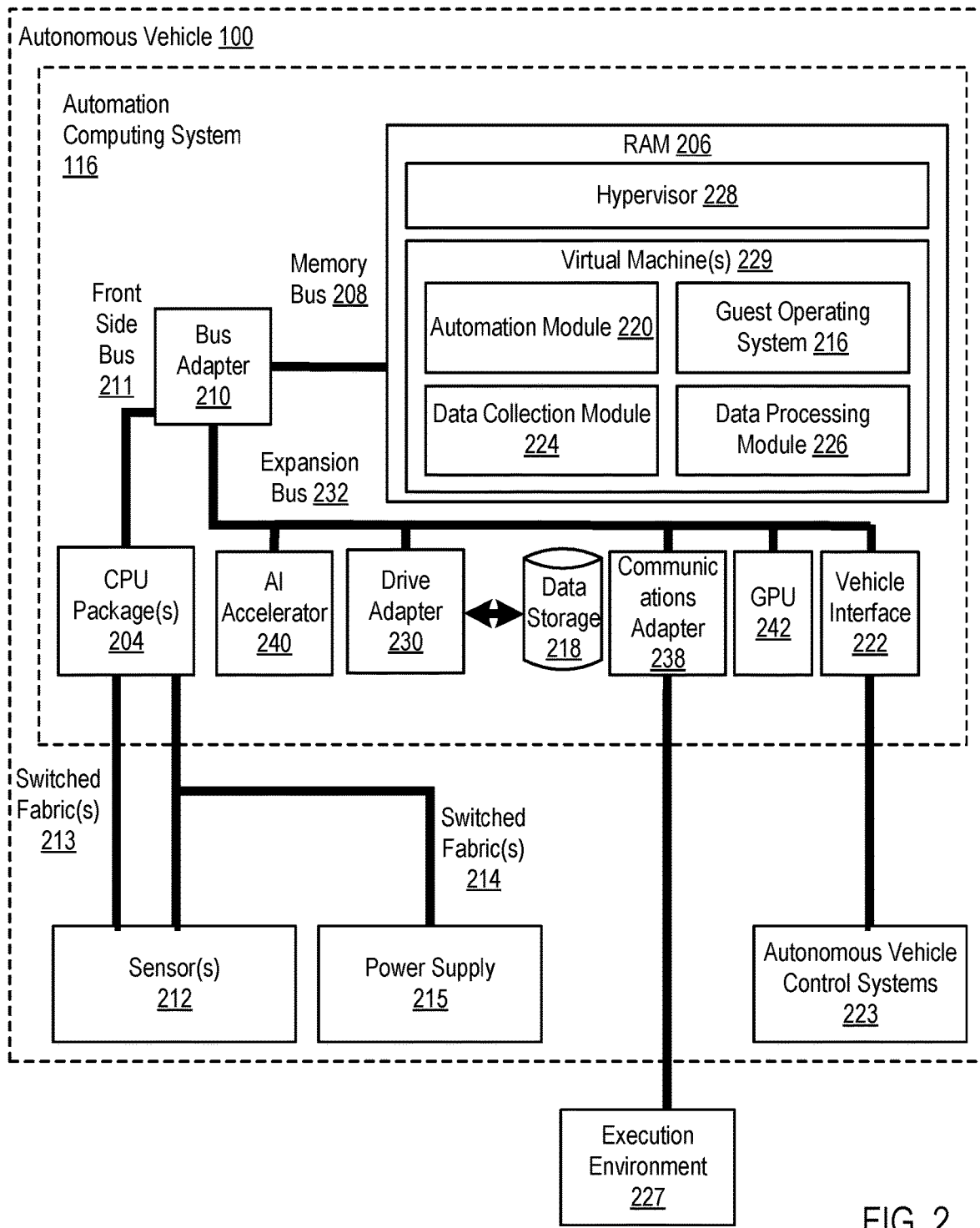
FIG. 2 is block diagram of an autonomous computing system for a failover system for autonomous vehicles.

The automation module 220, data collection module 224, data collection module 224, data processing module 226, hypervisor 228, and virtual machine 229 in the example of FIG. 2 are shown in RAM 206, but many components of such software typically are stored in non-volatile memory also, such as, for example, on data storage 218, such as a disk drive. Moreover, any of the automation module 220, data collection module 224, and data processing module 226 may be executed in a virtual machine 229 and facilitated by a guest operating system 216 of that virtual machine 229.

The automation computing system 116 of FIG. 2 includes disk drive adapter 230 coupled through expansion bus 232 and bus adapter 210 to CPU package(s) 204 and other components of the automation computing system 116. Disk drive adapter 230 connects non-volatile data storage to the automation computing system 116 in the form of data storage 218. Disk drive adapters 230 useful in computers configured for a failover system for autonomous vehicles according to embodiments of the present invention include Integrated Drive Electronics ('IDE') adapters, Small Computer System Interface ('SCSI') adapters, and others as will occur to those of skill in the art. Non-volatile computer memory also may be implemented for as an optical disk drive, electrically erasable programmable read-only memory (so-called 'EEPROM' or 'Flash' memory), RAM drives, and so on, as will occur to those of skill in the art.

The exemplary automation computing system 116 of FIG. 2 includes a communications adapter 238 for data communications with other computers and for data communications with a data communications network. Such data communications may be carried out serially through RS-238 connections, through external buses such as a Universal Serial Bus ('USB'), through data communications networks such as IP data communications networks, and in other ways as will occur to those of skill in the art. Communications adapters implement the hardware level of data communications through which one computer sends data communications to another computer, directly or through a data communications network. Examples of communications adapters useful in computers configured for a failover system for autonomous vehicles according to embodiments of the present invention include modems for wired dial-up communications, Ethernet (IEEE 802.3) adapters for wired data communications, 802.11 adapters for wireless data communications, as well as mobile adapters (e.g., cellular communications adapters) for mobile data communications. For example, the automation computing system 116 may communicate with one or more remotely disposed execution environments 227 via the communications adapter 238.

The exemplary automation computing system of FIG. 2 also includes one or more Artificial Intelligence (AI) accelerators 240. The AI accelerator 240 provides hardware-based assistance and acceleration of AI-related functions, including machine learning, computer vision, etc. Accordingly, performance of any of the automation module 220, data collection module 224, data processing module 226, or other operations of the automation computing system 116 may be performed at least in part by the AI accelerators 240.

The exemplary automation computing system of FIG. 2 also includes one or more graphics processing units (GPUs) 242. The GPUs 242 are configured to provide additional processing and memory resources for processing image and/or video data, including encoding, decoding, etc. Accordingly, performance of any of the automation module 220, data collection module 224, data processing module 226, or other operations of the automation computing system 116 may be performed at least in part by the GPUs 242.

Figure 3:
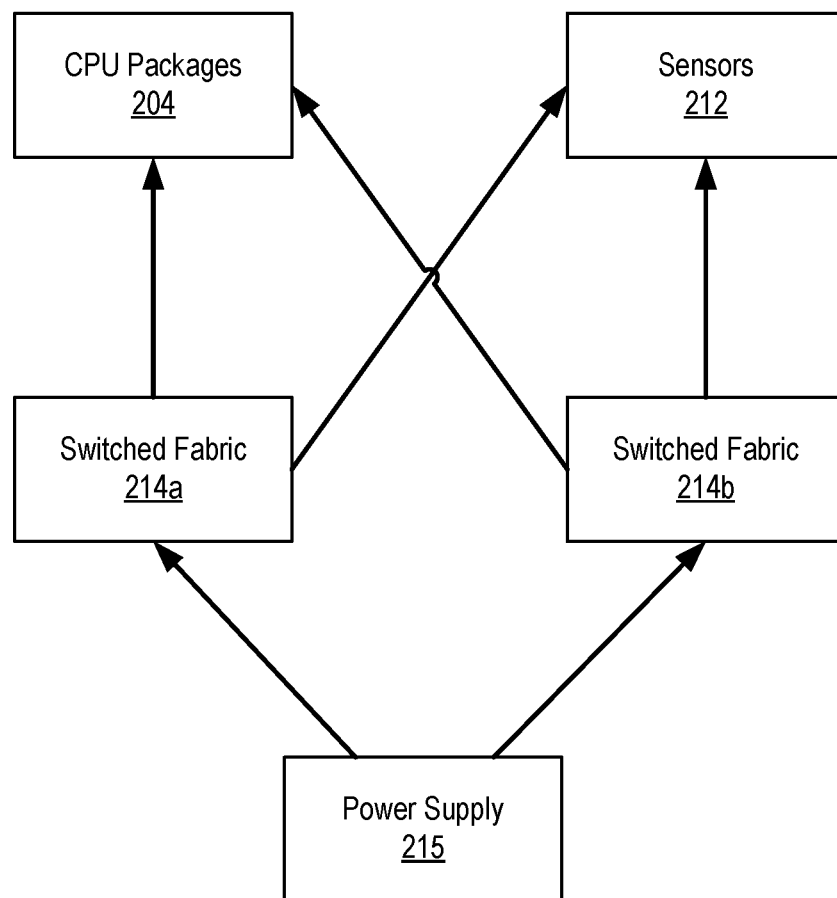
FIG. 3 is a block diagram of a redundant power fabric for a failover system for autonomous vehicles.

FIG. 3 shows an example redundant power fabric for a failover system for autonomous vehicles. The redundant power fabric provides redundant pathways for power transfer between the power supplies 215, the sensors 212, and the CPU packages 204. In this example, the power supplies 215 are coupled to the sensors 212 and CPU packages via two switched fabrics 214a and 214b. The topology shown in FIG. 3 provides redundant pathways between the power supplies 215, the sensors 212, and the CPU packages 204 such that power can be rerouted through any of multiple pathways in the event of a failure in an active connection pathway. The switched fabrics 214a and 214b may provide power to the sensors 212 using various connections, including Mobile Industry Processor Interface (MIPI), Inter-Integrated Circuit (I2C), Universal Serial Bus (USB), or another connection. The switched fabrics 214a and 214b may also provide power to the CPU packages 204 using various connections, including Peripheral Component Interconnect Express (PCIe), USB, or other connections. Although only two switched fabrics 214a and 214b are shown connecting the power supplies 215 to the sensors 212 and CPU packages 204, it is understood that the approach shown by FIG. 3 can be modified to include additional switched fabrics 214.

Figure 4:
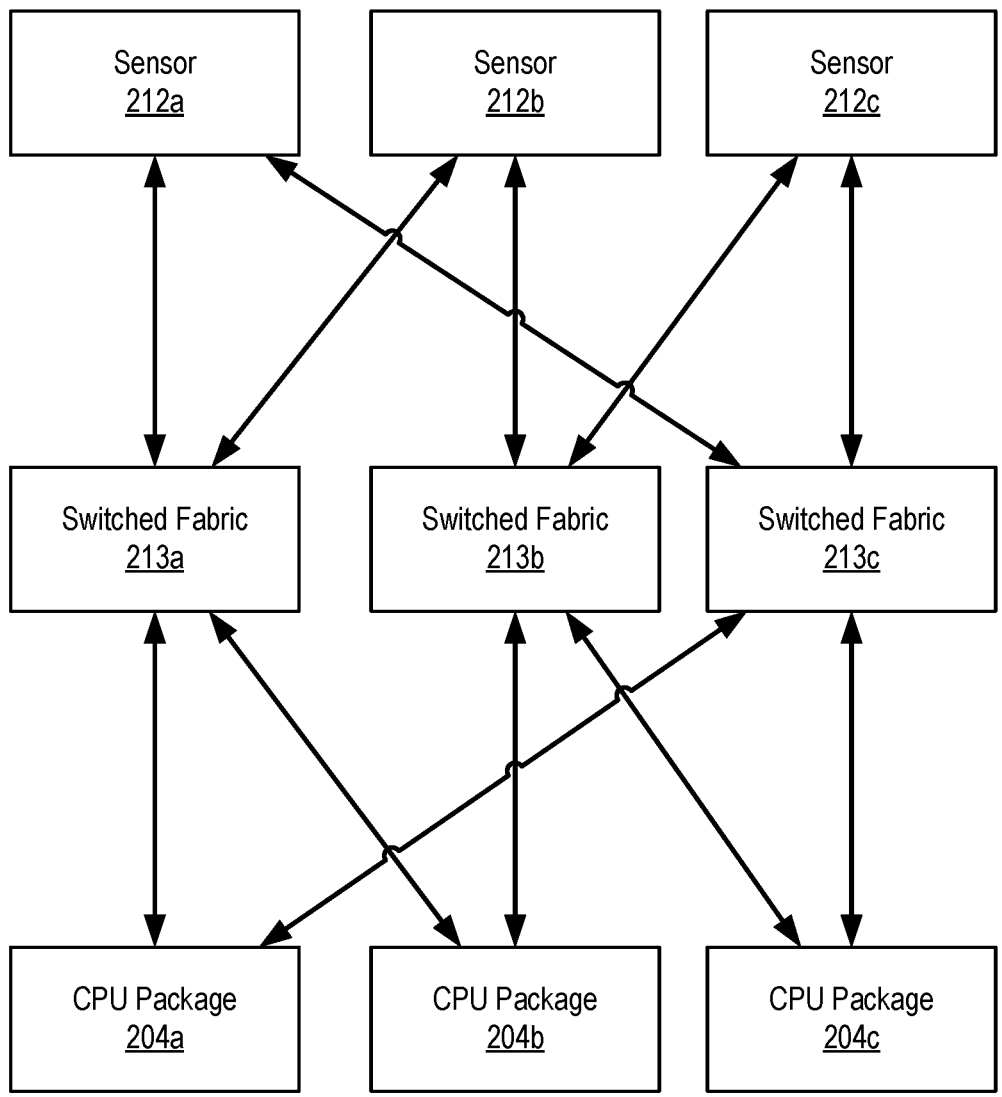
FIG. 4 is a block diagram of a redundant data fabric for a failover system for autonomous vehicles.

FIG. 4 is an example redundant data fabric for a failover system for autonomous vehicles. The redundant data fabric provides redundant data connection pathways between sensors 212 and CPU packages 204. In this example view, three CPU packages 204a, 204b, and 204c are connected to three sensors 212a, 212b, and 212c via three switched fabrics 213a, 213b, and 213c. Each CPU package 204a, 204b, and 204c is connected to a subset of the switched fabrics 213a, 213b, and 213c. For example, CPU package 204a is connected to switched fabrics 213a and 213c, CPU package 204b is connected to switched fabrics 213a and 213b, and CPU package 204c is connected to switched fabrics 213b and 213c. Each switched fabric 213a, 213b, and 213c is connected to a subset of the sensors 212a, 212b, and 212c. For example, switched fabric 213a is connected to sensors 212a and 212b, switched fabric 213b is connected to sensor 212b and 212c, and switched fabric 213c is connected to sensors 212a and 212c. Under this topology, each CPU package 204a, 204b, and 204c has an available connection path to any sensor 212a, 212b, and 212c. It is understood that the topology of FIG. 4 is exemplary, and that CPU packages, switched fabrics, sensors, or connections between components may be added or removed while maintaining redundancy as can be appreciated by one skilled in the art.

Figure 5:
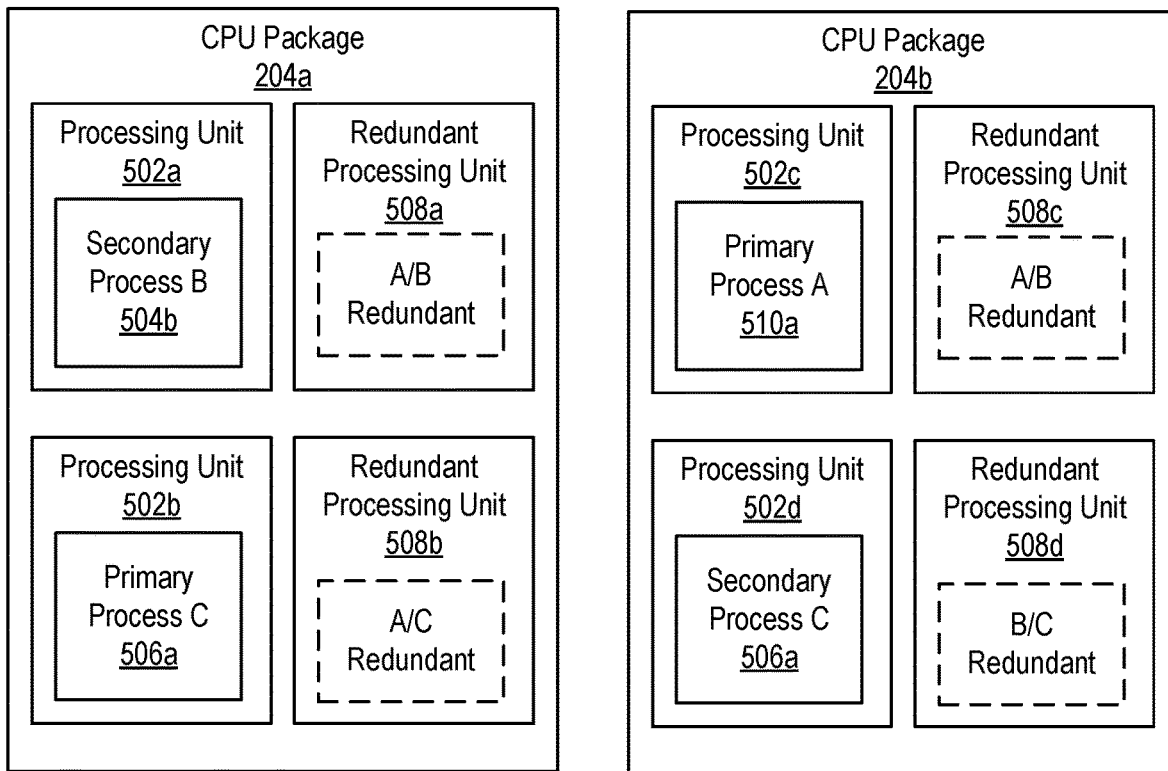
FIG. 5 is an example view of process allocation across CPU packages for a failover system for autonomous vehicles.
Figure 5:
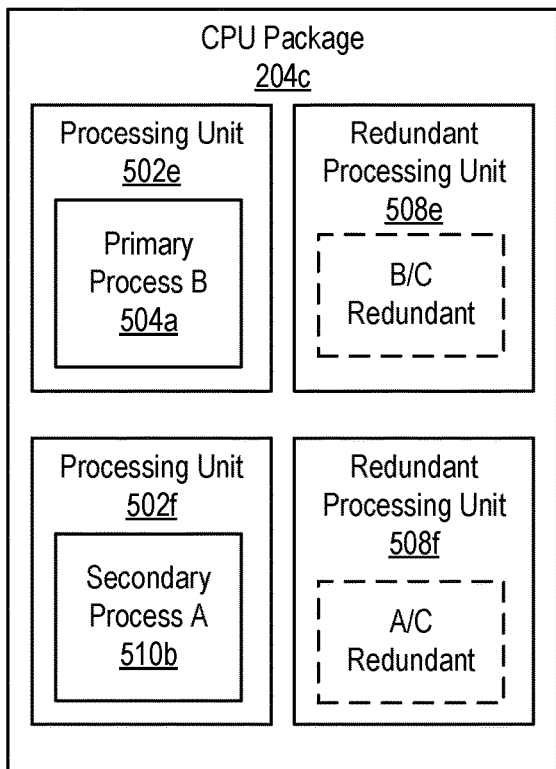

FIG. 5 is an example view of process allocation across CPU packages for a failover system for autonomous vehicles. Shown are three CPU packages 204a, 204b, and 204c. Each CPU package 204a includes a processing unit that has been allocated (e.g., by a hypervisor 228 or other process or service) primary execution of a process and another processing unit that has been allocated secondary execution of a process. As set forth herein, primary execution of a process describes an executing instance of a process whose output will be provided to another process or service. Secondary execution of the process describes executing an instance of the process in parallel to the primary execution, but the output may not be output to the other process or service. For example, in CPU package 204a, processing unit 502a has been allocated secondary execution of "process B," denoted as secondary process B 504b, while processing unit 502b has been allocated primary execution of "process C," denoted as primary process C 506a.

CPU package 204a also comprises two redundant processing units that are not actively executing a process A, B, or C, but are instead reserved in case of failure of an active processing unit. Redundant processing unit 508a has been reserved as "AB redundant," indicating that reserved processing unit 508a may be allocated primary or secondary execution of processes A or B in the event of a failure of a processing unit allocated the primary or secondary execution of these processes. Redundant processing unit 508b has been reserved as "A/C redundant," indicating that reserved processing unit 508b may be allocated primary or secondary execution of processes A or C in the event of a failure of a processing unit allocated the primary or secondary execution of these processes.

CPU package 204b includes processing unit 502c, which has been allocated primary execution of "process A," denoted as primary process A 510a, and processing unit 502d, which has been allocated secondary execution of "process C," denoted as secondary process C 506a. CPU package 204b also includes redundant processing unit 508c, reserved as "AB redundant," and redundant processing unit 508d, reserved as "B/C redundant." CPU package 204c includes processing unit 502e, which has been allocated primary execution of "process B," denoted as primary process B 504a, and processing unit 502f, which has been allocated secondary execution of "process A," denoted as secondary process A 510b. CPU package 204c also includes redundant processing unit 508e, reserved as "B/C redundant," and redundant processing unit 508f, reserved as "A/C redundant."

As set forth in the example view of FIG. 5, primary and secondary instances processes A, B, and C are each executed in an allocated processing unit. Thus, if a processing unit performing primary execution of a given process fails, the processing unit performing secondary execution may instead provide output of the given process to a receiving process or service. Moreover, the primary and secondary execution of a given process are executed on different CPU packages. Thus, if an entire processing unit fails, execution of each of the processes can continue using one or more processing units handling secondary execution. The redundant processing units 508a-f allow for allocation of primary or secondary execution of a process in the event of processing unit failure. This further prevents errors caused by processing unit failure as parallel primary and secondary execution of a process may be restored. One skilled in the art would understand that the number of CPU packages, processing units, redundant processing units, and processes may be modified according to performance requirements while maintaining redundancy.

Figure 6:
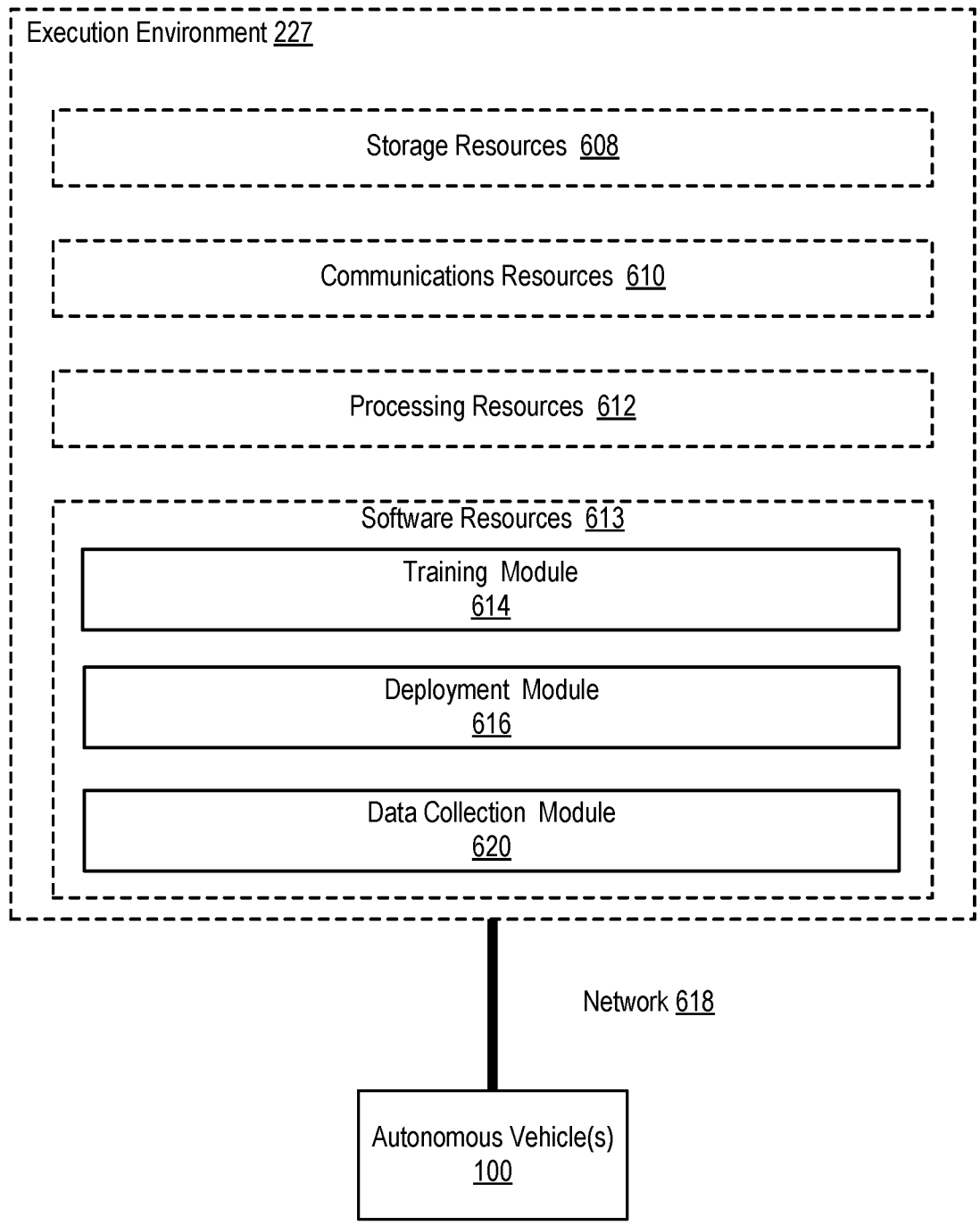
FIG. 6 is an example view of an execution environment for a failover system for autonomous vehicles.

For further explanation, FIG. 6 sets forth a diagram of an execution environment 227 accordance with some embodiments of the present disclosure. The execution environment 227 depicted in FIG. 6 may be embodied in a variety of different ways. The execution environment 227 may be provided, for example, by one or more physical or virtual machine components consisting of bare-metal applications, operating systems such as Android, Linux, Real-time Operating systems (RTOS), Automotive RTOS, such as AutoSAR, and others, including combinations thereof. The execution environment 227 may also be provided by cloud computing providers such as Amazon AWS, Microsoft Azure, Google Cloud, and others, including combinations thereof. Alternatively, the execution environment 227 may be embodied as a collection of devices (e.g., servers, storage devices, networking devices) and software resources that are included in a computer or distributed computer or private data center. Readers will appreciate that the execution environment 227 may be constructed in a variety of other ways and may even include resources within one or more autonomous vehicles or resources that communicate with one or more autonomous vehicles.

The execution environment 227 depicted in FIG. 6 may include storage resources 608, which may be embodied in many forms. For example, the storage resources 608 may include flash memory, hard disk drives, nano-RAM, 3D crosspoint non-volatile memory, MRAM, non-volatile phase-change memory ('PCM'), storage class memory ('SCM'), or many others, including combinations of the storage technologies described above. Readers will appreciate that other forms of computer memories and storage devices may be utilized as part of the execution environment 227, including DRAM, SRAM, EEPROM, universal memory, and many others. The storage resources 608 may also be embodied, in embodiments where the execution environment 227 includes resources offered by a cloud provider, as cloud storage resources such as Amazon Elastic Block Storage ('EBS') block storage, Amazon S3 object storage, Amazon Elastic File System ('EFS') file storage, Azure Blob Storage, and many others. The example execution environment 227 depicted in FIG. 6 may implement a variety of storage architectures, such as block storage where data is stored in blocks, and each block essentially acts as an individual hard drive, object storage where data is managed as objects, or file storage in which data is stored in a hierarchical structure. Such data may be saved in files and folders, and presented to both the system storing it and the system retrieving it in the same format.

The execution environment 227 depicted in FIG. 6 also includes communications resources 610 that may be useful in facilitating data communications between components within the execution environment 227, as well as data communications between the execution environment 227 and computing devices that are outside of the execution environment 227. Such communications resources may be embodied, for example, as one or more routers, network switches, communications adapters, and many others, including combinations of such devices. The communications resources 610 may be configured to utilize a variety of different protocols and data communication fabrics to facilitate data communications. For example, the communications resources 610 may utilize Internet Protocol ('IP') based technologies, fibre channel ('FC') technologies, FC over ethernet ('FCoE') technologies, InfiniBand ('IB') technologies, NVM Express ('NVMe') technologies and NVMe over fabrics ('NVMeoF') technologies, and many others. The communications resources 610 may also be embodied, in embodiments where the execution environment 227 includes resources offered by a cloud provider, as networking tools and resources that enable secure connections to the cloud as well as tools and resources (e.g., network interfaces, routing tables, gateways) to configure networking resources in a virtual private cloud. Such communications resources may be useful in facilitating data communications between components within the execution environment 227, as well as data communications between the execution environment 227 and computing devices that are outside of the execution environment 227 (e.g., computing devices that are included within an autonomous vehicle).

The execution environment 227 depicted in FIG. 6 also includes processing resources 612 that may be useful in useful in executing computer program instructions and performing other computational tasks within the execution environment 227. The processing resources 612 may include one or more application-specific integrated circuits ('ASICs') that are customized for some particular purpose, one or more central processing units ('CPUs'), one or more digital signal processors ('DSPs'), one or more field-programmable gate arrays ('FPGAs'), one or more systems on a chip ('SoCs'), or other form of processing resources 612. The processing resources 612 may also be embodied, in embodiments where the execution environment 227 includes resources offered by a cloud provider, as cloud computing resources such as one or more Amazon Elastic Compute Cloud ('EC2') instances, event-driven compute resources such as AWS Lambdas, Azure Virtual Machines, or many others.

The execution environment 227 depicted in FIG. 6 also includes software resources 613 that, when executed by processing resources 612 within the execution environment 227, may perform various tasks. The software resources 613 may include, for example, one or more modules of computer program instructions that when executed by processing resources 612 within the execution environment 227 are useful in training neural networks configured to determine control autonomous vehicle control operations. For example, a training module 614 may train a neural network using training data including sensor 212 data and control operations recorded or captured contemporaneous to the training data. In other words, the neural network may be trained to encode a relationship between an environment relative to an autonomous vehicle 100 as indicated in sensor 212 data and the corresponding control operations effected by a user or operation of the autonomous vehicle. The training module 614 may provide a corpus of training data, or a selected subset of training data, to train the neural network. For example, the training module 614 may select particular subsets of training data associated with particular driving conditions, environment states, etc. to train the neural network.

The software resources 613 may include, for example, one or more modules of computer program instructions that when executed by processing resources 612 within the execution environment 227 are useful in deploying software resources or other data to autonomous vehicles 100 via a network 618. For example, a deployment module 616 may provide software updates, neural network updates, or other data to autonomous vehicles 100 to facilitate autonomous vehicle control operations.

The software resources 613 may include, for example, one or more modules of computer program instructions that when executed by processing resources 612 within the execution environment 227 are useful in collecting data from autonomous vehicles 100 via a network 618. For example, a data collection module 620 may receive, from autonomous vehicles 100, collected sensor 212, associated control operations, software performance logs, or other data. Such data may facilitate training of neural networks via the training module 614 or stored using storage resources 608.

Figure 7:
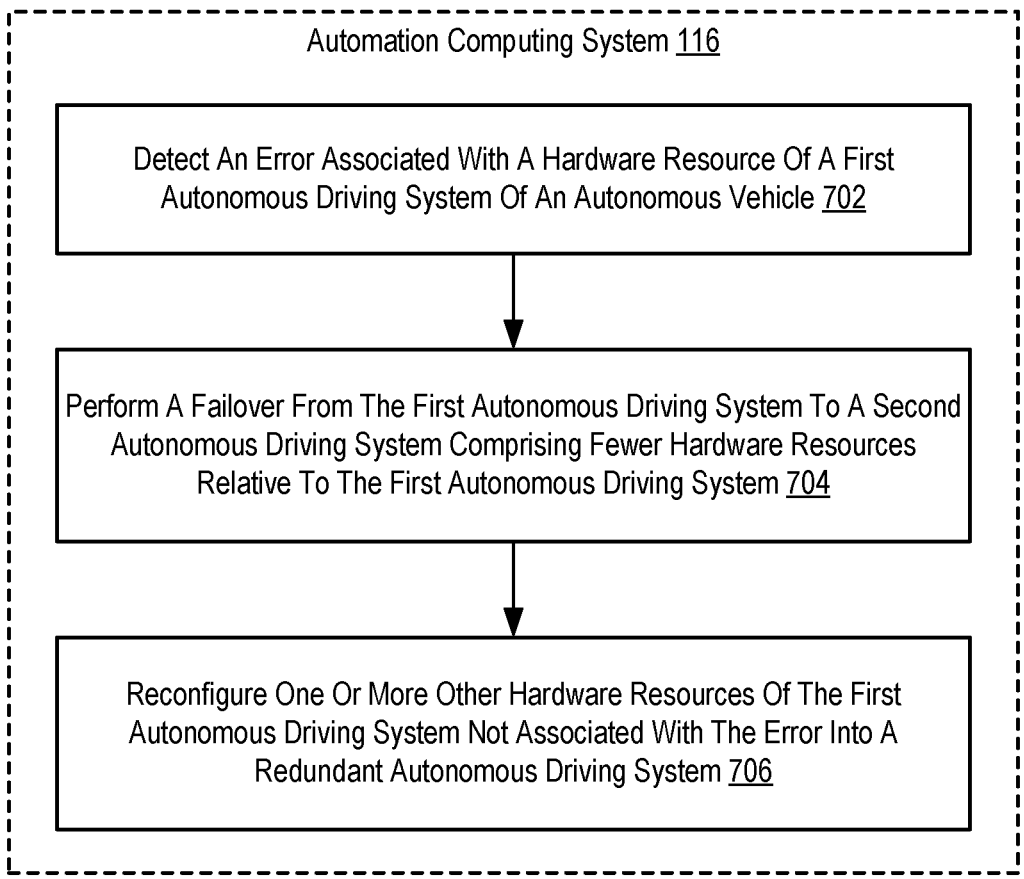
FIG. 7 is a flowchart of an example method for a failover system for autonomous vehicles.

For further explanation, FIG. 7 sets forth a flow chart illustrating an example method for a failover system for autonomous vehicles that includes detecting 702 (e.g., by an automation computing system 116) an error associated with a hardware resource of a first autonomous driving system of an autonomous vehicle 100. As disclosed herein, an autonomous driving system refers to a collection of hardware components and software components executable by the hardware components that generate driving decisions (e.g., control operations) by collecting and processing sensor data from various sensors 212. Accordingly, an autonomous driving system includes sensors 212, processing resources such as CPU packages 204 or other processors, one or more models (e.g., machine learning models or algorithmic models) that facilitate generating control operations for the autonomous vehicle 100, and any required storage resources (e.g., for storing models and the like). Accordingly, an autonomous driving system may include a subset of components of the automation computing system 116 as well as sensors 212 communicatively coupled to the automation computing system 116 (e.g., via switched fabrics 213). The error may be associated with a particular hardware resource such as a particular sensor 212, a particular processing resource (e.g., a particular processor or CPU package 204), or another hardware resource as can be appreciated. The error may indicate that the particular hardware resource is no longer operative, no longer operating within a particular acceptable performance range, or otherwise defective.

Detecting 702 the error may include determining that a heartbeat or other signal expected from a particular resource is not received. For example, in some embodiments, the automation computing system 116 may receive a signal at a predefined interval from a particular hardware resource. The error may then be detected in response to a failure to receive that signal. As another example, detecting 702 the error may include detecting a disconnection or unplugging event associated with a particular hardware resource (e.g., a particular sensor 212 or processing resource becomes unplugged or disconnected. As a further example, where the particular hardware resource associated with the error includes a sensor 212, detecting 702 the error may include determining, by a processing resource configured to processes data from the sensor 212, that the sensor 212 is providing invalid data. Such invalid data may include data that is corrupted, fails particular data validation or verification tests, or is otherwise invalid. Such invalid data may also include unusable sensor data (e.g., blank images, occluded images, and the like). In such an example, the error may be detected in response to received sensor data being invalid for a predefined time interval or for a predefined threshold number of sensor data payloads, thereby indicating that the sensor 212 is producing invalid data and will likely continue to do so.

The method of FIG. 7 also includes performing 704 a failover from the first autonomous driving system to a second autonomous driving system comprising fewer hardware resources relative to the first autonomous driving system. The second autonomous driving system includes similar hardware resources to the first autonomous driving system (e.g., sensors 212, processing resources and the like). The hardware resources of the second autonomous driving system and the first autonomous driving system are independent (e.g., non-overlapping) such that a hardware failure in the first autonomous driving system will not also be a hardware failure the second autonomous driving system.

As is set forth above, the second autonomous driving system has fewer hardware resources relative to the first autonomous driving system. For example, the second autonomous driving system may include fewer sensors, fewer processing resources, and the like. Consider an example where a first autonomous driving system includes four CPU packages 204 (hereinafter referred to as CPU packages A, B, C, and D). This example first autonomous driving system also includes two cameras for each facing of the car (e.g., forward facing cameras A and B, left side facing cameras A and B, right side facing cameras A and B, and rear facing cameras A and B). CPU packages A-D are therefore configured to process sensor data (e.g., image data) from these cameras to generate control operations for the autonomous vehicle 100 based on one or more models executed in the CPU packages A-D. Continuing with this example, a second autonomous driving system may include a single CPU package E and single cameras for each facing of the car (e.g., forward facing camera C, left side facing camera C, right side facing camera C, and rear facing camera C). Thus, the CPU package E processes sensor data (e.g., image data) from its cameras to also generate control operations for the autonomous vehicle 100 based on one or more models executed in the CPU package E.

As the first and second autonomous driving systems have different sensing and/or processing capabilities, the models used by the first and second autonomous driving systems may be different. For example, as both the first and second autonomous driving systems need to generate control operations under real-time constraints, the models used by the first autonomous driving system may be configured or trained to leverage the greater processing resources available to the first autonomous driving system, while the models used by the second autonomous driving system may be configured or trained to generate control operations using lesser processing resources. As another example, the models used by the first autonomous driving system may be trained and configured to make driving decisions using image data from multiple cameras facing the same side, thereby allowing the first autonomous driving system to use stereoscopic vision in performing driving decisions (e.g., to gauge object distance, object speed, and the like). Conversely, the models used by the second autonomous driving system may be trained and configured to make driving decisions using image data from a single camera per side, precluding the use of stereoscopic vision. Thus, the models of the second autonomous driving system may be configured to use other approaches for gauging object distance or speed, such as image object size and image object size change over time.

Due to the difference in hardware resources between the first autonomous driving system and the second autonomous driving system, the models used by the second autonomous driving system may be configured to perform fewer driving decisions (e.g., generate fewer control operations) than the first autonomous driving system. For example, the second autonomous driving system may be configured to not perform lane change operations or parallel parking operations due to having more limited processing resources, lacking stereoscopic vision on certain sides of the car, or due to other limitations or considerations.

Performing 704 the failover from the first autonomous driving system to the second autonomous driving system causes control operations generated by the second autonomous driving system to be applied to the autonomous vehicle 100 instead of control operations generated by the first autonomous driving system. In other words, prior to the failover, while the autonomous vehicle 100 is in an autonomous driving mode, control operations generated by the first autonomous driving system were applied (e.g., by providing the control operations to autonomous vehicle control system 223 via the vehicle interface 222), thereby effecting the control operations determined by the first autonomous driving system. After the failover, the control operations generated by the second autonomous driving system are instead applied and effected.

In some embodiments, prior to the failover and in an autonomous driving mode, the first autonomous driving system and the second autonomous driving system are operating concurrently. Thus, both the first autonomous driving system and the second autonomous driving system are generating control operations concurrently. Prior to the failover, the automation computing system 116 is configured to select and apply the control operations generated by the first autonomous driving system. After the failover, the automation computing system 116 then selects and applies the control operations generated by the second autonomous driving system. Thus, as both the first autonomous driving system and the second autonomous driving system are operating concurrently, the automation computing system 116 is able to perform the failover faster than if the second autonomous driving system needed to be booted or started prior to generating its control operations.

The method of FIG. 7 also includes reconfiguring 706 one or more other hardware resources of the first autonomous driving system not associated with the error into a redundant autonomous driving system. The allocation of hardware resources of the redundant autonomous driving system corresponds to the allocation of hardware resources of the second autonomous driving system. That is, the redundant autonomous driving system will have a matching, but non-overlapping, set of hardware resources compared to the second autonomous driving system.

Continuing with the example above, assume that a failure of left side facing camera A occurs in the first autonomous driving system, causing a failover to the second autonomous driving system. The first autonomous driving system is then reconfigured into a redundant autonomous driving system including a single CPU package and single cameras for each facing of the autonomous vehicle 100. For example, the redundant autonomous driving system may be composed of CPU package A, front facing camera A, rear facing camera A, left side facing camera B, and right side facing camera A.

Reconfiguring 706 the one or more other hardware resources of the first autonomous driving system may include deactivating particular hardware resources of the first autonomous driving system not used in the redundant autonomous driving system. Reconfiguring 706 the one or more other hardware resources of the first autonomous driving system may include establishing or severing one or more communications paths (e.g., in switched fabrics 213) between sensors 212 and processing resources.

The redundant autonomous driving system is redundant to the second autonomous driving system. That is, the redundant autonomous driving system includes similar hardware and software capabilities to the second autonomous driving system. In some embodiments, the redundant autonomous driving system is configured to operate concurrently to the second autonomous driving system such that both the redundant autonomous driving system and the second autonomous driving system generate control operations concurrently. Absent a failover to the redundant autonomous driving system, the automation computing system 116 will select the control operations generated by the second autonomous driving system for application.

The approaches set forth above allow for an autonomous vehicle 100 to failover between primary and secondary autonomous driving systems (e.g., first and second autonomous driving systems described above) without requiring full hardware redundancy between the primary and secondary autonomous driving systems. Furthermore, the approaches set forth above allow for a fully redundant autonomous driving system (relative to the secondary autonomous driving system) to be established in response to a failure in the primary autonomous driving system, allowing for an extra layer of hardware redundancy and durability.

Figure 8:
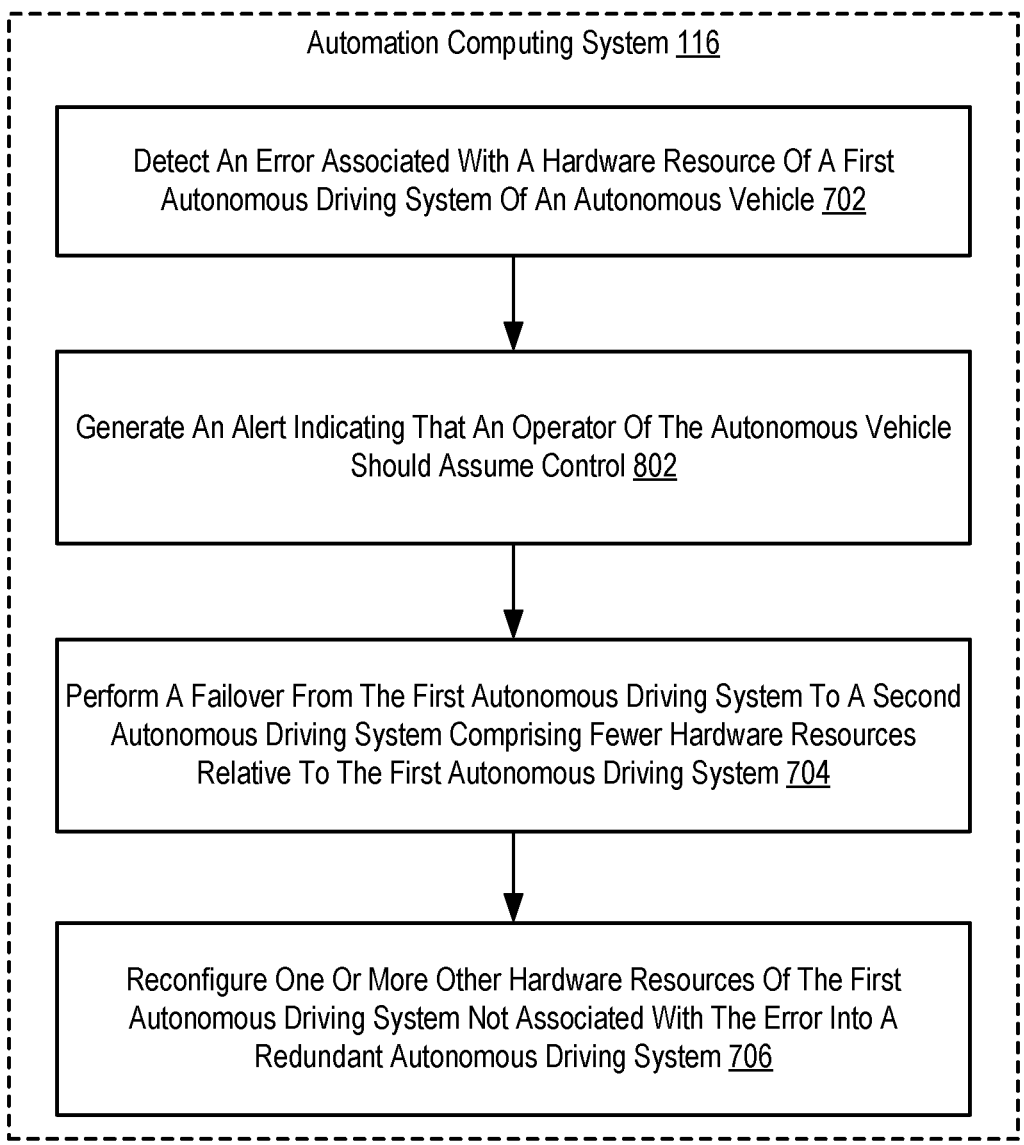
FIG. 8 is a flowchart of another example method for a failover system for autonomous vehicles.

For further explanation, FIG. 8 sets forth a flow chart illustrating an example method for a failover system for autonomous vehicles. The method of FIG. 8 is similar to FIG. 7 in that the method of FIG. 8 includes detecting 702 (e.g., by an automation computing system 116) an error associated with a hardware resource of a first autonomous driving system of an autonomous vehicle 100; performing 704 a failover from the first autonomous driving system to a second autonomous driving system comprising fewer hardware resources relative to the first autonomous driving system; and reconfiguring 706 one or more other hardware resources of the first autonomous driving system not associated with the error into a redundant autonomous driving system.

The method of FIG. 8 differs from FIG. 7 in that the method of FIG. 8 includes generating 802 an alert indicating that an operator of the autonomous vehicle 100 should assume control. Generating 802 the alert may include, for example, activating lights in a dashboard of the autonomous vehicle 100, providing a message or notification to a display in the autonomous vehicle 100, causing sounds or other audible notifications to play, and the like. Generating 802 the alert is performed in response to the detected error and the failover to the second autonomous driving system.

As is set forth above, the second autonomous driving system includes fewer hardware resources relative to the first autonomous driving system. Accordingly, the driving decisions made and control operations generated by the second autonomous driving system may differ from the first autonomous driving system and may possibly be less accurate due to the hardware constraints of the second autonomous vehicle. Also, as set forth above, the second autonomous driving system may be limited in the driving decisions and control operations it may generate (e.g., the second autonomous driving system may not be able to perform lane changes). Accordingly, it may be preferable for an operator (e.g., driver) to take control of the autonomous vehicle 100, thereby deactivating an autonomous driving mode of the autonomous vehicle 100. Thus, the second autonomous driving system may serve to maintain an autonomous driving mode of the autonomous vehicle 100 until manual control is resumed. The autonomous driving mode may then be exited in response to a detected interaction with a steering wheel, pedal, or component of the autonomous vehicle 100, or in response to a user input (e.g., button or menu selection) to end the autonomous driving mode.

Figure 9:
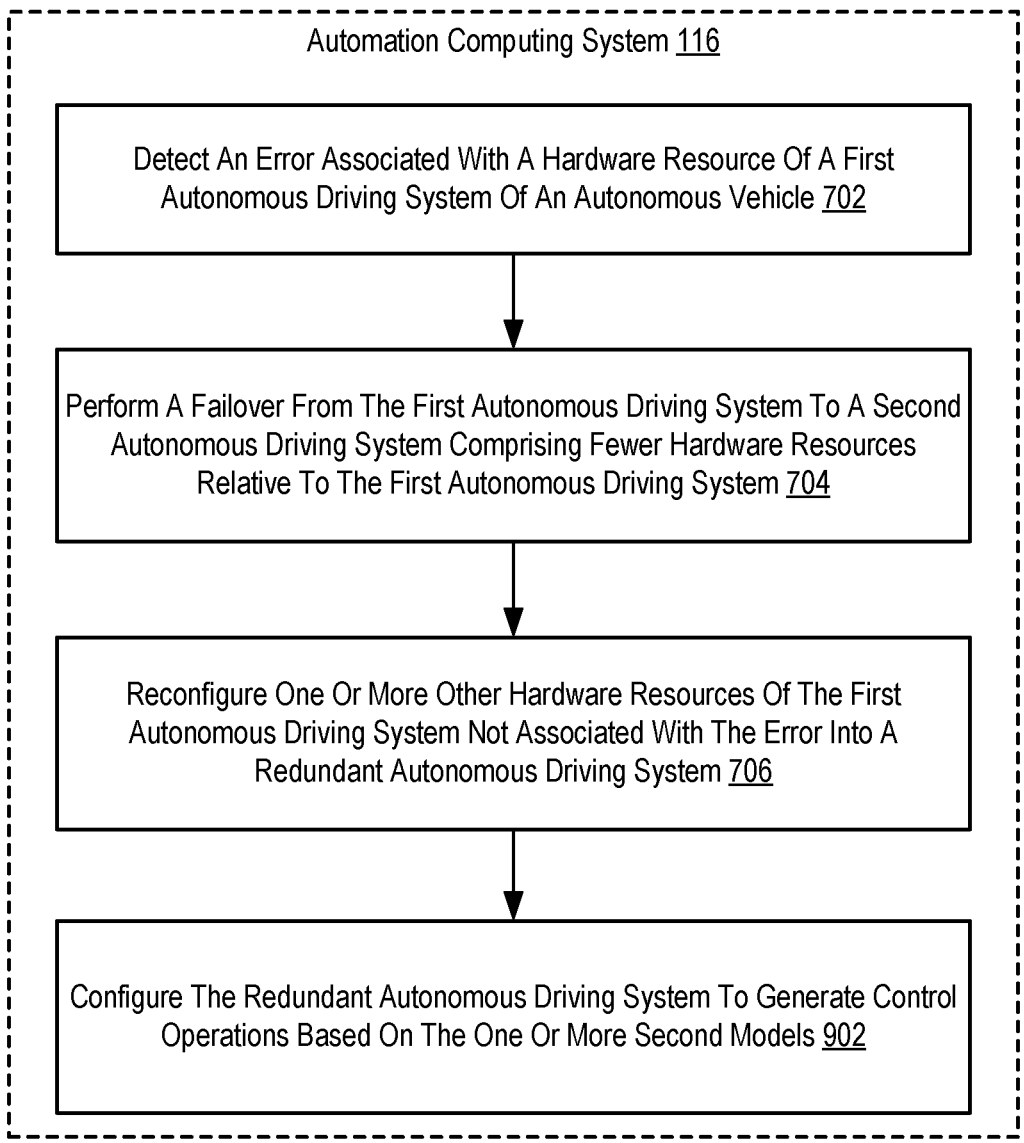
FIG. 9 is a flowchart of another example method for a failover system for autonomous vehicles.

For further explanation, FIG. 9 sets forth a flow chart illustrating an example method for a failover system for autonomous vehicles. The method of FIG. 9 is similar to FIG. 7 in that the method of FIG. 9 includes detecting 702 (e.g., by an automation computing system 116) an error associated with a hardware resource of a first autonomous driving system of an autonomous vehicle 100; performing 704 a failover from the first autonomous driving system to a second autonomous driving system comprising fewer hardware resources relative to the first autonomous driving system; and reconfiguring 706 one or more other hardware resources of the first autonomous driving system not associated with the error into a redundant autonomous driving system.

Assume that the first autonomous driving system is configured to generate control operations based on one or more first models and the second autonomous driving system is configured to generate control operations based on one or more second models different than the one or more first models due to the differing hardware resources in the first and second autonomous driving systems. The method of FIG. 9 differs from FIG. 7 in that the method of FIG. 9 includes configuring 902 the redundant autonomous driving system to generate control operations based on the one or more second models. As the redundant autonomous driving system has reduced hardware resources compared to the first autonomous driving system from which it was configured, the models used by the first autonomous driving system may not be suitable for use in the redundant autonomous driving system. Accordingly, as the redundant autonomous driving system as hardware resources similar to the second autonomous driving system, the redundant autonomous driving system should instead use the one or more second models also used by the second autonomous driving system. In some embodiments, the one or more second models are stored in storage resources used by the first autonomous driving system and the redundant autonomous driving system to eliminate any data transfer overhead that would be required in order to copy the one or more second models from the second autonomous driving system to the redundant autonomous driving system.

Figure 10:
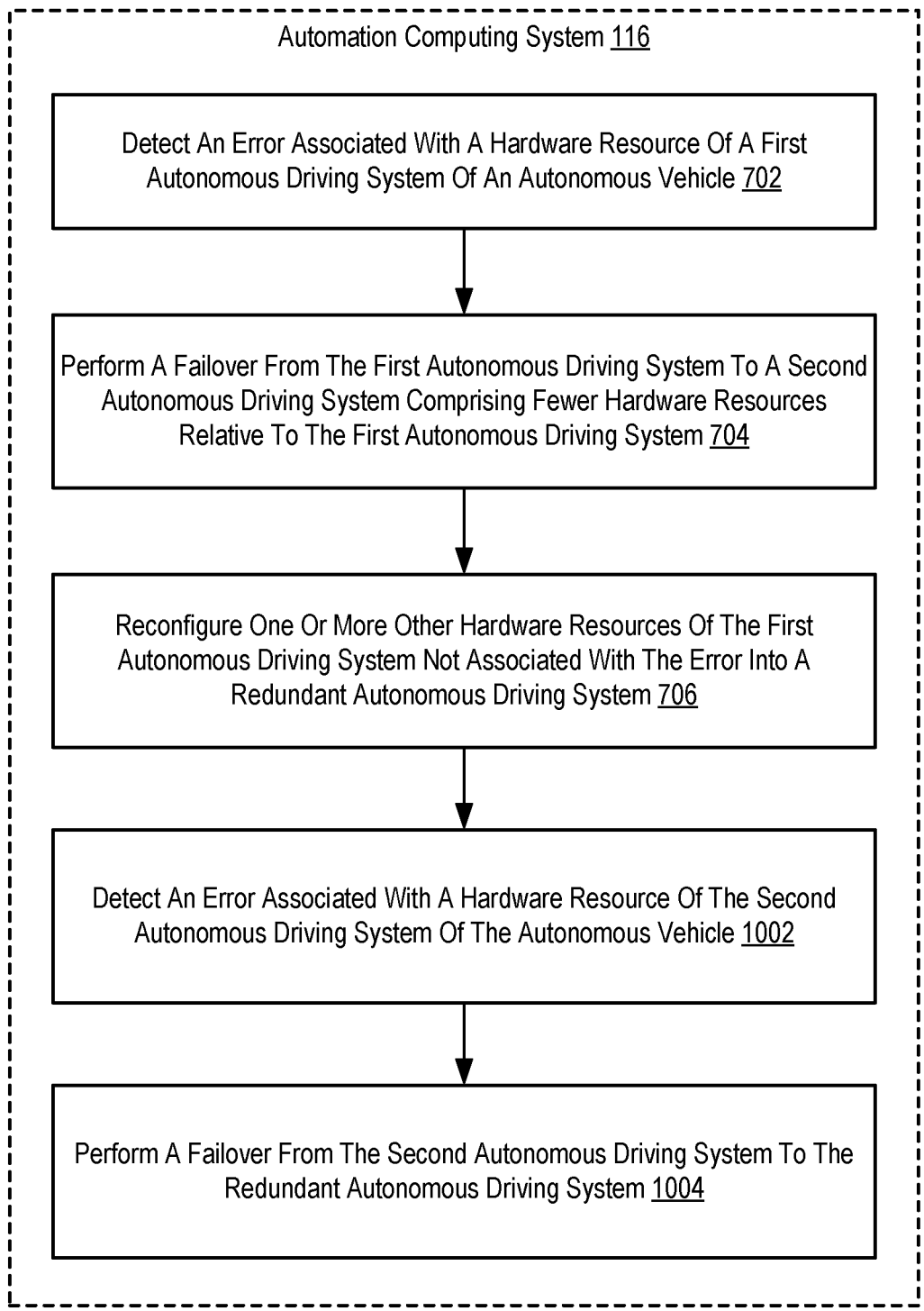
FIG. 10 is a flowchart of another example method for a failover system for autonomous vehicles.

For further explanation, FIG. 10 sets forth a flow chart illustrating an example method for a failover system for autonomous vehicles. The method of FIG. 10 is similar to FIG. 7 in that the method of FIG. 10 includes detecting 702 (e.g., by an automation computing system 116) an error associated with a hardware resource of a first autonomous driving system of an autonomous vehicle 100; performing 704 a failover from the first autonomous driving system to a second autonomous driving system comprising fewer hardware resources relative to the first autonomous driving system; and reconfiguring 706 one or more other hardware resources of the first autonomous driving system not associated with the error into a redundant autonomous driving system.

The method of FIG. 10 differs from FIG. 7 in that the method of FIG. 10 includes detecting 1002 an error associated with a hardware resource of the second autonomous driving system of the autonomous vehicle 100. Detecting 1002 the error associated with a hardware resource of the second autonomous driving system of the autonomous vehicle 100 may be performed using similar approaches described above with respect to the error associated with the hardware resource of the first autonomous driving system.

The method of FIG. 10 also includes performing 1004 a failover from the second autonomous driving system to the redundant autonomous driving system. For example, assume that, prior to the failover from the second autonomous driving system to the redundant autonomous driving system, the second autonomous driving system and the redundant autonomous driving system are operating concurrently to generate control operations for the autonomous vehicle. The automation computing system 116 selects the control operations from the second autonomous driving system for application prior to the failover. Performing 1004 the failover causes the control operations generated by the redundant autonomous driving system to instead be selected and applied. Thus, the redundant autonomous driving system serves as a fully redundant autonomous driving system used in the event of a failure in the second autonomous driving system.

In view of the explanations set forth above, readers will recognize that the benefits of a failover system for autonomous vehicles according to embodiments of the present invention include:

Improved performance of an autonomous vehicle by providing for a secondary autonomous driving system in the event of a failure in a primary autonomous driving system without the need for full hardware redundancy between the primary and secondary autonomous driving systems.

Improved performance of an autonomous vehicle by allowing for dynamic configuration of a fully hardware redundant autonomous driving system from the functional components of a primary autonomous driving system with a failed component.

Exemplary embodiments of the present invention are described largely in the context of a fully functional computer system for a failover system for autonomous vehicles. Readers of skill in the art will recognize, however, that the present invention also may be embodied in a computer program product disposed upon computer readable storage media for use with any suitable data processing system. Such computer readable storage media may be any storage medium for machine-readable information, including magnetic media, optical media, or other suitable media. Examples of such media include magnetic disks in hard drives or diskettes, compact disks for optical drives, magnetic tape, and others as will occur to those of skill in the art. Persons skilled in the art will immediately recognize that any computer system having suitable programming means will be capable of executing the steps of the method of the invention as embodied in a computer program product. Persons skilled in the art will recognize also that, although some of the exemplary embodiments described in this specification are oriented to software installed and executing on computer hardware, nevertheless, alternative embodiments implemented as firmware or as hardware are well within the scope of the present invention.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It will be understood that any of the functionality or approaches set forth herein may be facilitated at least in part by artificial intelligence applications, including machine learning applications, big data analytics applications, deep learning, and other techniques. Applications of such techniques may include: machine and vehicular object detection, identification and avoidance; visual recognition, classification and tagging; algorithmic financial trading strategy performance management; simultaneous localization and mapping; predictive maintenance of high-value machinery; prevention against cyber security threats, expertise automation; image recognition and classification; question answering; robotics; text analytics (extraction, classification) and text generation and translation; and many others.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A method for a failover system for autonomous vehicles, comprising:
    detecting an error associated with a hardware resource of a first autonomous driving system of the autonomous vehicle;
    performing a failover from the first autonomous driving system to a second autonomous driving system comprising fewer hardware resources relative to the first autonomous driving system, wherein performing the failover causes control operations generated by the second autonomous driving system to be applied to the autonomous vehicle instead of control operations generated by the first autonomous driving system; and
    reconfigure one or more other hardware resources of the first autonomous driving system not associated with the error into a redundant autonomous driving system.

2. The method of claim 1, wherein an allocation of hardware resources of the redundant autonomous driving system corresponds to an allocation of hardware resources of the second autonomous driving system.

3. The method of claim 1, wherein the second autonomous driving system comprises at least one of: fewer processing resources relative to the first autonomous driving system or fewer sensors relative to the first autonomous driving system.

4. The method of claim 1, further comprising generating an alert indicating that an operator of the autonomous vehicle should assume control.

5. The method of claim 1, wherein the first autonomous driving system is configured to generate control operations based on one or more first models, the second autonomous driving system is configured to generate control operations based on one or more second models, and the method further comprises configuring the redundant autonomous driving system to generate control operations based on the one or more second models.

6. The method of claim 5, wherein the one or more second models are trained to generate fewer control operations than the one or more first models.

7. The method of claim 1, further comprising:
    detecting an error associated with a hardware resource of the second autonomous driving system of the autonomous vehicle; and
    performing a failover from the second autonomous driving system to the redundant autonomous driving system.

8. An apparatus for a failover system for autonomous vehicles, the apparatus configured to perform steps comprising:
    detecting an error associated with a hardware resource of a first autonomous driving system of the autonomous vehicle;
    performing a failover from the first autonomous driving system to a second autonomous driving system comprising fewer hardware resources relative to the first autonomous driving system, wherein performing the failover causes control operations generated by the second autonomous driving system to be applied to the autonomous vehicle instead of control operations generated by the first autonomous driving system; and
    reconfigure one or more other hardware resources of the first autonomous driving system not associated with the error into a redundant autonomous driving system.

9. The apparatus of claim 8, wherein an allocation of hardware resources of the redundant autonomous driving system corresponds to an allocation of hardware resources of the second autonomous driving system.

10. The apparatus of claim 8, wherein the second autonomous driving system comprises at least one of: fewer processing resources relative to the first autonomous driving system or fewer sensors relative to the first autonomous driving system.

11. The apparatus of claim 8, wherein the steps further comprise generating an alert indicating that an operator of the autonomous vehicle should assume control.

12. The apparatus of claim 8, wherein the first autonomous driving system is configured to generate control operations based on one or more first models, the second autonomous driving system is configured to generate control operations based on one or more second models, and the steps further comprise configuring the redundant autonomous driving system to generate control operations based on the one or more second models.

13. The apparatus of claim 12, wherein the one or more second models are trained to generate fewer control operations than the one or more first models.

14. The apparatus of claim 8, wherein the steps further comprise:
    detecting an error associated with a hardware resource of the second autonomous driving system of the autonomous vehicle; and
    performing a failover from the second autonomous driving system to the redundant autonomous driving system.

15. A computer program product disposed upon a non-transitory computer readable medium, the computer program product comprising computer program instructions for a failover system for autonomous vehicles that, when executed, cause a computer system of the autonomous vehicle to carry out steps comprising:
    detecting an error associated with a hardware resource of a first autonomous driving system of the autonomous vehicle;
    performing a failover from the first autonomous driving system to a second autonomous driving system comprising fewer hardware resources relative to the first autonomous driving system, wherein performing the failover causes control operations generated by the second autonomous driving system to be applied to the autonomous vehicle instead of control operations generated by the first autonomous driving system; and
    reconfigure one or more other hardware resources of the first autonomous driving system not associated with the error into a redundant autonomous driving system.

16. The computer program product of claim 15, wherein an allocation of hardware resources of the redundant autonomous driving system corresponds to an allocation of hardware resources of the second autonomous driving system.

17. The computer program product of claim 15, wherein the second autonomous driving system comprises at least one of: fewer processing resources relative to the first autonomous driving system or fewer sensors relative to the first autonomous driving system.

18. The computer program product of claim 15, wherein the steps further comprise generating an alert indicating that an operator of the autonomous vehicle should assume control.

19. The computer program product of claim 15, wherein the first autonomous driving system is configured to generate control operations based on one or more first models, the second autonomous driving system is configured to generate control operations based on one or more second models, and the steps further comprise configuring the redundant autonomous driving system to generate control operations based on the one or more second models.

20. The computer program product of claim 19, wherein the one or more second models are trained to generate fewer control operations than the one or more first models.

* * * * *